United States Patent [19]

Seelig

[11] Patent Number: 5,791,861

[45] Date of Patent: Aug. 11, 1998

[54] ROTATABLE VACUUM LIFTING AND TRANSPORTING APPARATUS

[76] Inventor: David L. Seelig. 670 Lime St. Rd. 190 3. Palmerton, Pa. 18071

[21] Appl. No.: 869,404

[22] Filed: Jun. 5, 1997

Related U.S. Application Data

[63] Continuation of Ser. No. 509,202, Jul. 31, 1995, abandoned.

[51] Int. Cl.$^6$ ............................................ B25G 15/06
[52] U.S. Cl. .................... 414/627; 414/749; 212/276; 901/49
[58] Field of Search .................... 901/49; 414/752, 414/749, 908, 730, 21, 607, 618, 626, 627, 674; 294/907, 64.1; 212/276, 278, 282, 283, 319, 345

[56] References Cited

U.S. PATENT DOCUMENTS

| | | | |
|---|---|---|---|
| 2,848,128 | 8/1958 | Thompson | 212/319 |
| 3,103,282 | 9/1963 | Nork | 414/626 |
| 3,227,299 | 1/1966 | Draxler | 414/627 |
| 3,339,764 | 9/1967 | Stanfield | 214/315 |
| 3,376,061 | 4/1968 | Harris et al. | 294/64 |
| 3,587,892 | 6/1971 | Vermette | 214/313 |
| 3,896,957 | 7/1975 | Sinclair | 214/652 |
| 4,413,853 | 11/1983 | Andersson | 294/64 R |
| 4,557,659 | 12/1985 | Scaglia | 414/627 |
| 4,640,661 | 2/1987 | Rasmussen | 414/911 |
| 4,725,186 | 2/1988 | Jerve | 414/627 |
| 5,039,274 | 8/1991 | Bennisen | 414/752 |
| 5,207,550 | 5/1993 | Lehman | 414/420 |

*Primary Examiner*—Karen M. Young
*Assistant Examiner*—Gregory A. Morse
*Attorney, Agent, or Firm*—Sanford J. Piltch

[57] ABSTRACT

A suspendable apparatus for the lifting, rotating and transferring of essentially smooth-walled cylindrical objects, where such apparatus is preferably an air cylinder. The apparatus comprises a vertically oriented lifting mechanism consisting of a lifting chamber fixed at its upper end and movable at its lower end, with power to the air cylinder in the chamber. Additionally, there is a rotating mechanism for gripping and rotating the cylindrical object, such as a drum or paper roll. The rotating mechanism is mounted on a fixed arm secured to the lower end for movement therewith. The rotating mechanism further includes a housing having a fixed end secured to the fixed arm and a second end remote therefrom. The second end includes a pair of movable gripping arms mounted for rotational movement about the second end, where the arms include at least two arcuate shaped cups positioned to apply a vacuum against the wall of the cylindrical object. Finally, a fail-safe sensing system is incorporated herein which detects a pre-determined weight of the cylindrical object, whereby at a value above this pre-determined weight, the lifting and vacuum gripping system hereof cannot be inadvertently or manual terminated.

10 Claims, 7 Drawing Sheets

ROTATABLE VACUUM LIFTING AND TRANSPORTING APPARATUS

CROSS REFERENCE TO RELATED APPLICATION

This application is a continuation of U.S. patent application Ser. No. 08/509,202, filed Jul. 31, 1995, now abandoned.

BACKGROUND OF THE INVENTION

This invention is directed to vacuum and air powered apparatus for lifting, rotating, and transferring relatively smooth walled cylindrical objects, such as drums and paper rolls. A unique feature hereof is the provision of a fail-safe sensing system that will prevent an inadvertent release of the vacuum when a working load of predetermined weight is detected. This invention has particular utility in the handling of what may be described as a 55 gallon drum which typically features a smooth wall and a pair of spaced-apart annular ribs. While the invention has in its preferred application the handling of such drums, no limitation should be read thereon except as set forth in the appended claims.

Typically, such handling equipment has been mounted on a lift type truck, an expensive alternative to the present invention. U.S. Pat. No. 3,376,061 represents an early version of a lift truck, drum handling apparatus. Briefly, the invention thereof relates particularly to a suction cup for handling cylindrical loads of different diameters mounted on a rotatable load apron of a lift truck. The cup includes a pair of cylindrically curved plate sections hinged together along a straight side edge of each for articulation relative to the load apron about a longitudinal hinge axis of the cup. An endless tubular elastomer sealing lip with a removable load-engaging portion extends forwardly from peripheral edges of the plate sections. Pairs of load-engaging pads are positioned within the cup on opposite sides of the hinge axis. These pairs of pads are mounted independently of the plate sections by posts which extend through the curved plate sections to connect the pads directly to the load apron. The pairs of pads are mounted at a constant inclination toward one another to define wedging surfaces. Thus, a load to be lifted is engaged only by the pads and sealing lip and supported primarily by the frame-mounted pads rather than by the articulated plate sections so as to provide an unusually stable load support. Moreover, because of the constant inclination of the pad surfaces with respect to the horizontal when the plates are disposed in a position with one pad directly above the other, the vacuum force required to lift a cylindrical load with its longitudinal axis in a horizontal plane varies only with the weight of the load and not its diameter.

U.S. Pat. No. 3,896,957, represents another vehicular attached system for handling drums, rolls and the like. The system thereof includes a rotatable frame, with an open space, clamp arms, a pin for attaching the clamp arms to the rotatable frame, and at least two piston cylinder cylindrical assemblies—one connected between the clamp arms for rotating the clamp arms with respect to each other about the pin, and the other connected to the rotatable frame and one of the clamp arms for simultaneous rotation of the clamp arms about the pin. The pin is located adjacent to the rotatable frame and is offset from the center line of rotation of the rotatable frame. The first piston and cylinder assembly is located within the open center space of the rotatable frames while the second assembly is located within the body of one of the clamp arms.

However, not all drum handling apparatus has been limited to vehicular attached devices, as described above. U.S. Pat. No. 3,587,892 teaches a carriage mounted device. The device thereof is directed to an apparatus for elevating, as well as or tipping or tilting drums, containers and the like for dumping the contents therefrom. The device includes an upright or post supported on a base and a carriage member slidable on said upright and operated by means of a winch which raises and lowers the carriage member on the upright. The carriage member supports a rotatable member which carries means for engaging a drum container and the like so that the drum may be elevated as well as tipped or tilted.

A more recent entry into a carriage mounted system is taught in U.S. Pat. No. 5,207,550. The invention thereof relates to a drum handler which includes a frame and carriage attached to the frame to move along a vertical line of travel. A lift drive is provided for moving the carriage along the line of travel. A drum engagement member is carried on the carriage for movement therewith. The drum engagement member includes mechanism for gripping a drum and a rotary drive is provided for rotating the gripping member about a generally horizontal axis.

There is a third approach as an alternative to the vehicular attached systems, and the latter system of a carriage mounted device. This third approach is described in U.S. Pat. No. 3,339,764. The invention relates to a lifting and dumping device for refuse containers wherein the container may be quickly engaged by the device and the entire assembly may be elevated by a crane to position the container over a storage area.

A latch on the device may be released for tilting the container to empty the contents in the storage area. The empty container and lifting device may be lowered by the crane to the original position for the container, and the lifting device disengaged therefrom.

For purposes of categorizing the present invention, it falls into the last group of patents. However, it offers some unique advantages to a suspended system.

Such advantages will become apparent to those skilled in the art, particularly when read in conjunction with the accompanying drawings.

SUMMARY OF THE INVENTION

This invention is directed to a suspendable, vacuum or air powered apparatus for the lifting, rotating, and transferring of essentially smooth-walled cylindrical objects, such as a 55 gallon drum, as known in the art. The apparatus comprises a lifting mechanism, a rotating mechanism, and a fail-safe sensing system. The lifting mechanism may be a vacuum chamber or an air operated piston fixed at its upper end and movable at its lower end, and includes means to provide a vacuum to the chamber. The rotating mechanism, for gripping and rotating a cylindrical object, is mounted on a fixed arm secured to the vacuum chamber's lower end for movement therewith. Additionally, the rotating mechanism further includes a housing having a fixed end secured to the fixed arm and a second end remote therefrom, where the second end includes a pair of movable gripping arms mounted for rotational movement about the second end. The arms include at least two arcuate shaped cups positioned to apply a vacuum against the wall of the cylindrical object, and there are means for creating a vacuum at the cups. Finally, a fail-safe sensing system is provided which detects a predetermined weight of the cylindrical object, whereby at a value above the predetermined weight the vacuum system hereof cannot be inadvertently or manually terminated.

DETAILED DESCRIPTION OF PREFERRED EMBODIMENT

The invention hereof relates to a vacuum powered apparatus for lifting, rotating and transferring articles such as essentially smooth-walled cylindrical objects, preferably a 55 gallon drum, as known in the art.

Figure 1:
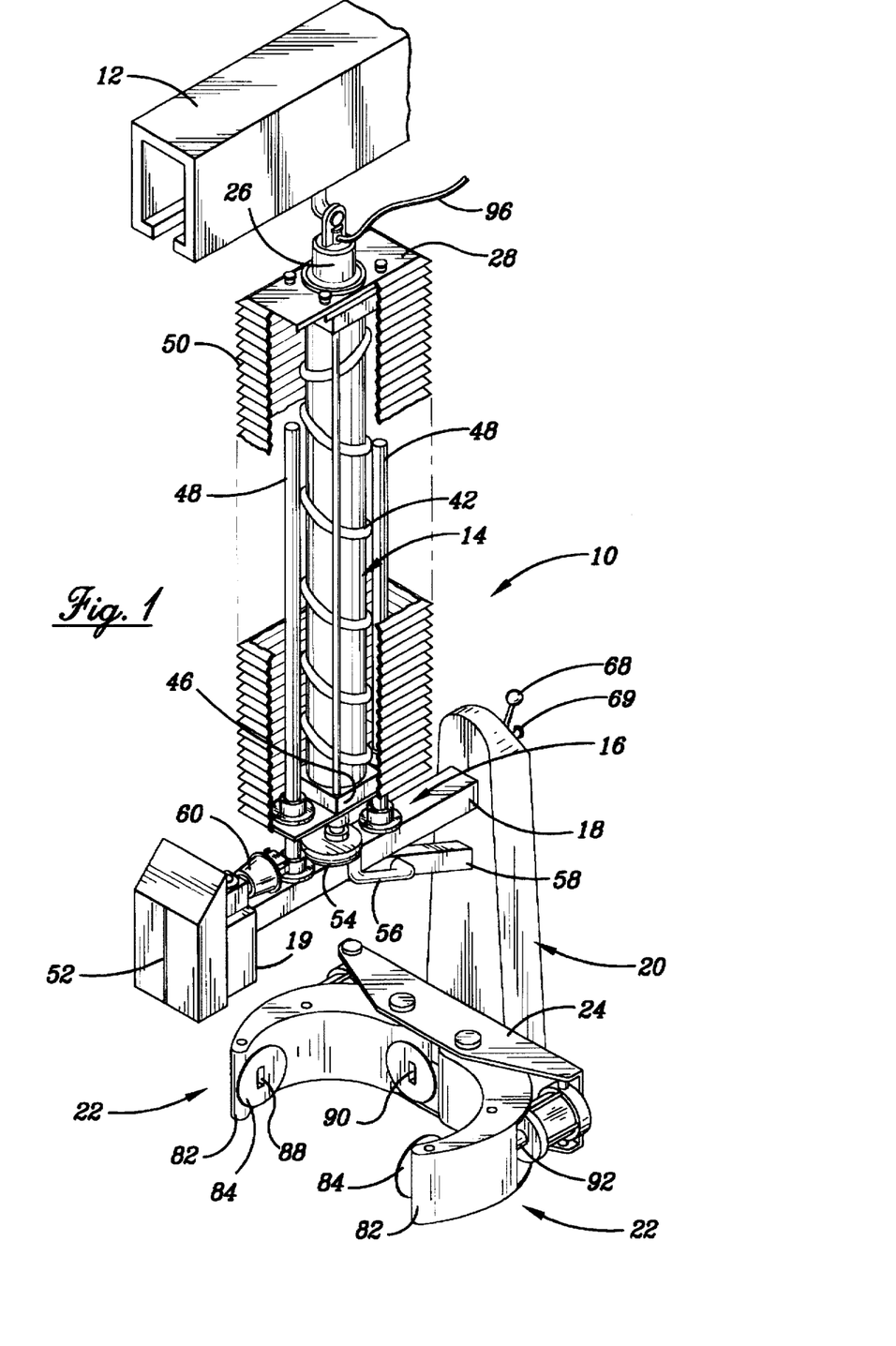
FIG. 1 is a full perspective view of the lifting, rotating, and transferring apparatus of this invention, which apparatus is particularly suited to handling relatively smooth-walled cylindrical objects, such as drums.

FIG. 1 is a perspective view of the apparatus 10, where such apparatus is illustrated as suspended from an elevated rail 12 for movement along such a rail from a pick-up station, for example, to a dispensing or deposit station. The apparatus 10 comprises an air piston or cylinder chamber 14 supporting a horizontal member 16, where such horizontal member includes at one end 18 thereof a vertical support 20, and a pair of movable gripping members 22 mounted for rotational movement about the remote end 24 of vertical support 20.

Figure 2:
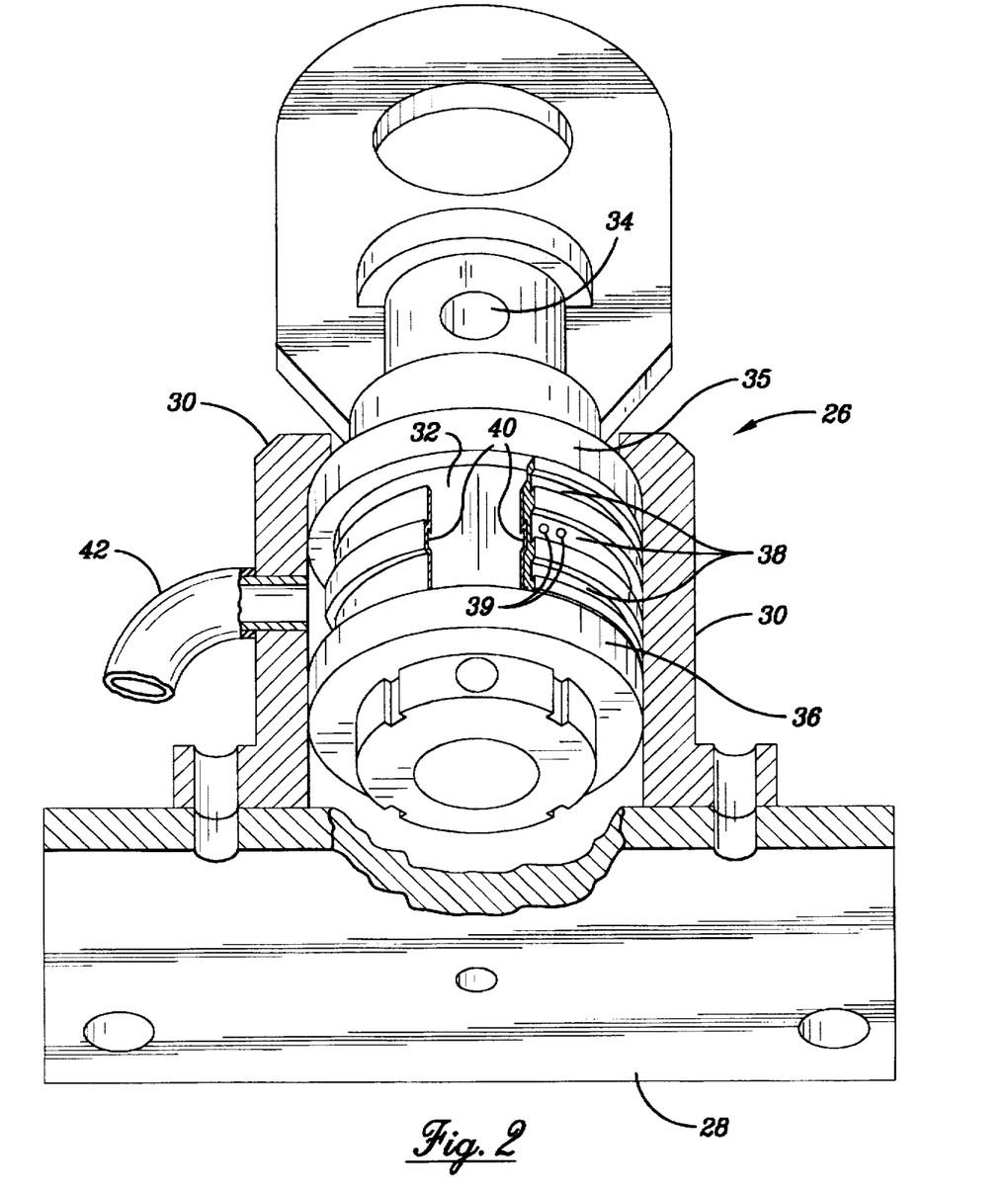
FIG. 2 is a partial perspective view of the suspension mechanism and vacuum feed to the apparatus hereof.

The chamber 14, preferably an air cylinder or piston, is illustrated in FIGS. 1 and 2. While the preferred system for lifting is by an air piston, as known in the art, an alternate approach is by vacuum, where a full description of the latter may be found in U.S. Pat. No. 5,221,117, by the inventor hereof as a co-inventor of such prior art, where the full disclosure thereof is incorporated herein by reference. In any case, the rotary joint 26, as illustrated in FIG. 2 for an air cylinder, includes a plate 28, support arms 30 mounted for pivotal movement, about 360°, about the fixed rotary joint member 32, where an air feed line opening 34 is illustrated for supplying air to the rotary joint member 32 from air supply line 96. The rotary joint member 32 includes upper and lower bearing members 35,36, respectively, plural circular channels 38 for receiving elastomeric 0-rings in the upper and lower channels 38 as known in the art, and air flow apertures 39 spaced continually about middle channel 38 to communicate with an internal circular channel 40 which is in communication with the air feed line opening 34. The middle channel 38 provides air flow through the outer supports and cover of the upper rotary joint 26 to the air line 42.

The piston chamber 14 further includes a volume tank 44, a vertically movable base 46, mounted for stabilizing movement along vertical supports 48, and a flexible, accordion-like cover 50 surrounding the supports 48 of air cylinder 14.

Figure 3:
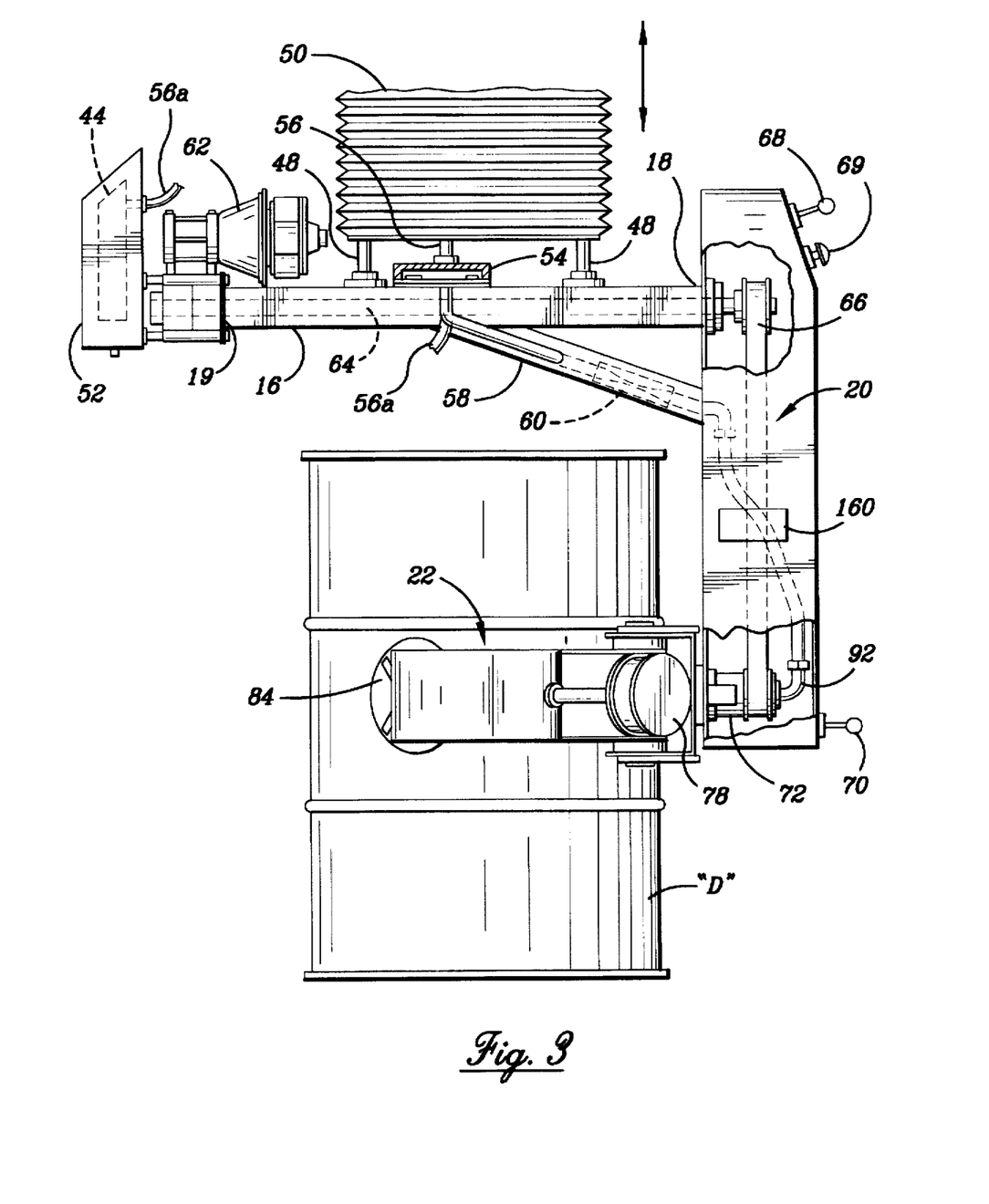
FIG. 3 is a partial side view, with portions removed to illustrate certain internal details, of the rotating mechanism of the apparatus of this invention.
Figure 4:
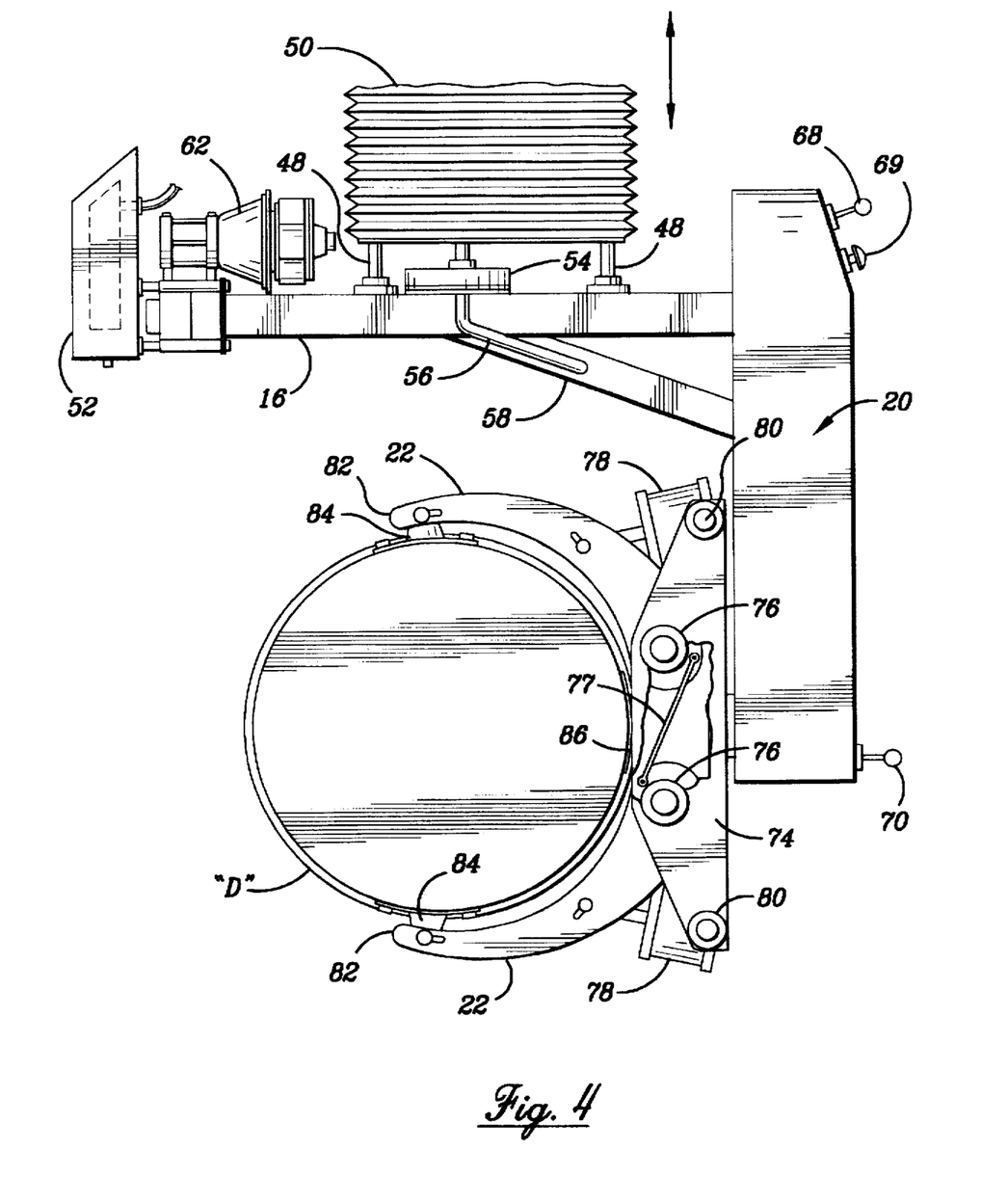
FIG. 4 is a partial side view similar to FIG. 4, where the received drum has been rotated 90° showing a synchronous motion rod member between paired gripping arms.

Mounted to the base 46 is the horizontal support member 16 extending between a first end 18 and a second end 19, see FIGS. 3 and 4. Extending from the volume tank 44 into a housing 54, mounted intermediate said first and second ends 18,19, is a second air feed line 56. The air feed line 56 splits off a secondary air feed line 56a which provides air flow to the volume tank 44 of the air lift system, as well as control air at pilot pressure to the various pneumatic control switches and valves of the apparatus 10 which will be described in greater detail below.

The air feed line 56 returns into angled support arm 58 within which is mounted a venturi pump 60, as known in the art, which converts the positive air feed from air volume tank 44 into a vacuum fed to the movable gripping members 22, as hereinafter explained.

To ensure some counter balancing to the apparatus, a counter-weight 52 which houses volume tank 44 (as shown in FIG. 3) is mounted on the second end 19 of horizontal member 16 to approximate the horizontal equilibrium or leveling of the apparatus 10. A reversible air motor 62 is also mounted on the second end 19 of the horizontal support member 16 to drive, by means of shaft 64, the belt 66 for providing a rotative movement to the movable gripping members 22. The belt 66 and manual controls 68,70 are contained in or on the vertical support 20, as best illustrated in FIG. 3. FIG. 3, with some parts removed to illustrate certain internal details, depicts a position of securing a drum "D" from the floor, for example, while FIG. 4, a view similar to FIG. 3, shows the drum rotated 90°, a position the drum might be in during transport or emptying the contents thereof.

Figure 5:
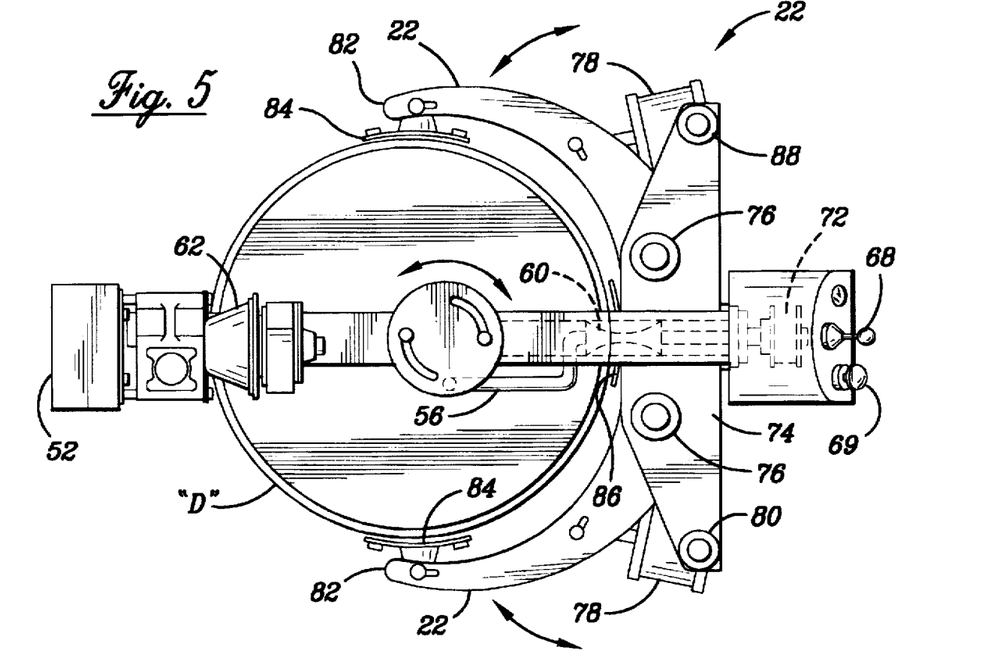
FIG. 5 is a top view of the rotating mechanism of the apparatus, as the pair of arms thereof are positioned to grip a drum, for example.
Figure 6:
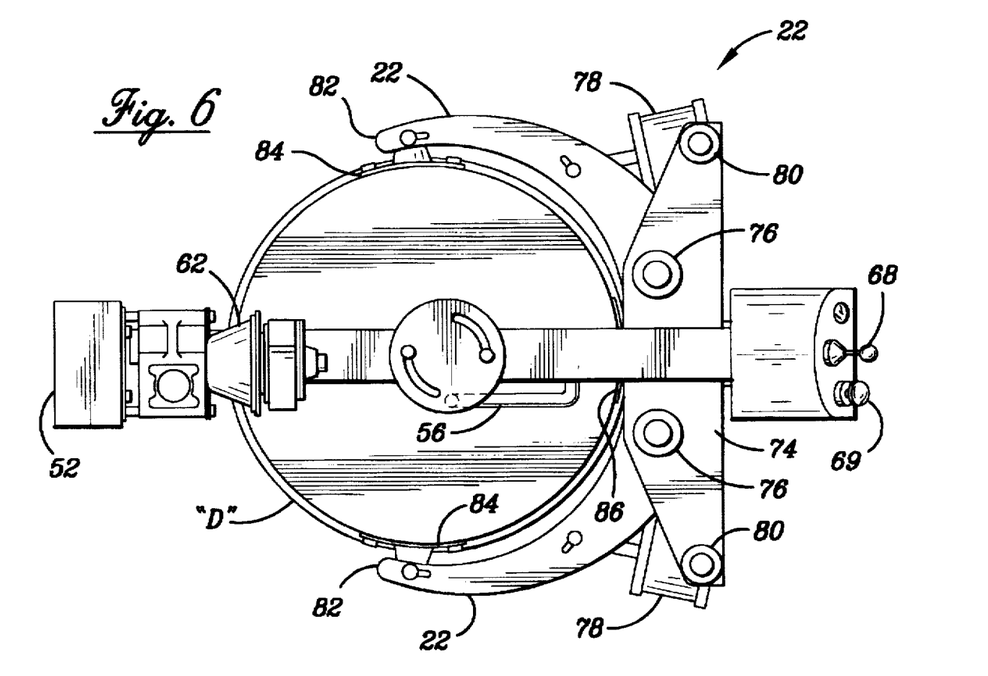
FIG. 6 is a top view similar to FIG. 5, showing the pair of arms engaged with the drum.

Turning now to the movable gripping arms or members 22, as best seen in FIGS. 5 and 6, the system includes a rotary joint 72, a channel shaped, elongated member 74 mounted for rotational movement thereabout, and a pair of arcuately shaped gripping arms 22. The gripping arms 22 are pivotally mounted to the channel member 74 by pins 76 and are moveable relative thereto by pivotally mounted pistons 78, note the direction arrows in FIG. 5. That is, the pistons 78 are pivotal about pins 80 with the free ends of the pistons movable by expanding to grip, or by retracting to release, the gripping arms 22, as the operation dictates. The free or distal ends 82 of the gripping arms 22 are each equipped with a pivotal arcuate shaped cup-like members 84. Additionally, at the junction of said arms 22 is a third arcuate shaped cup-like member 86, where the three cup-like members 84,86 cooperate to grip the contained drum "D". Preferably, the three cup-like members 84,86 may be provided with an annular elastomeric gasket about the periphery of such members. Finally, each such cup-like member includes a central opening 88,90 (see FIG. 1), which communicate with the vacuum line 92. By this arrangement, particularly with the peripheral gaskets, a vacuum may be created at the three cup-like members 84,86. FIGS. 5 and 6 represent preloading and loaded positions, respectively.

Figure 7A:
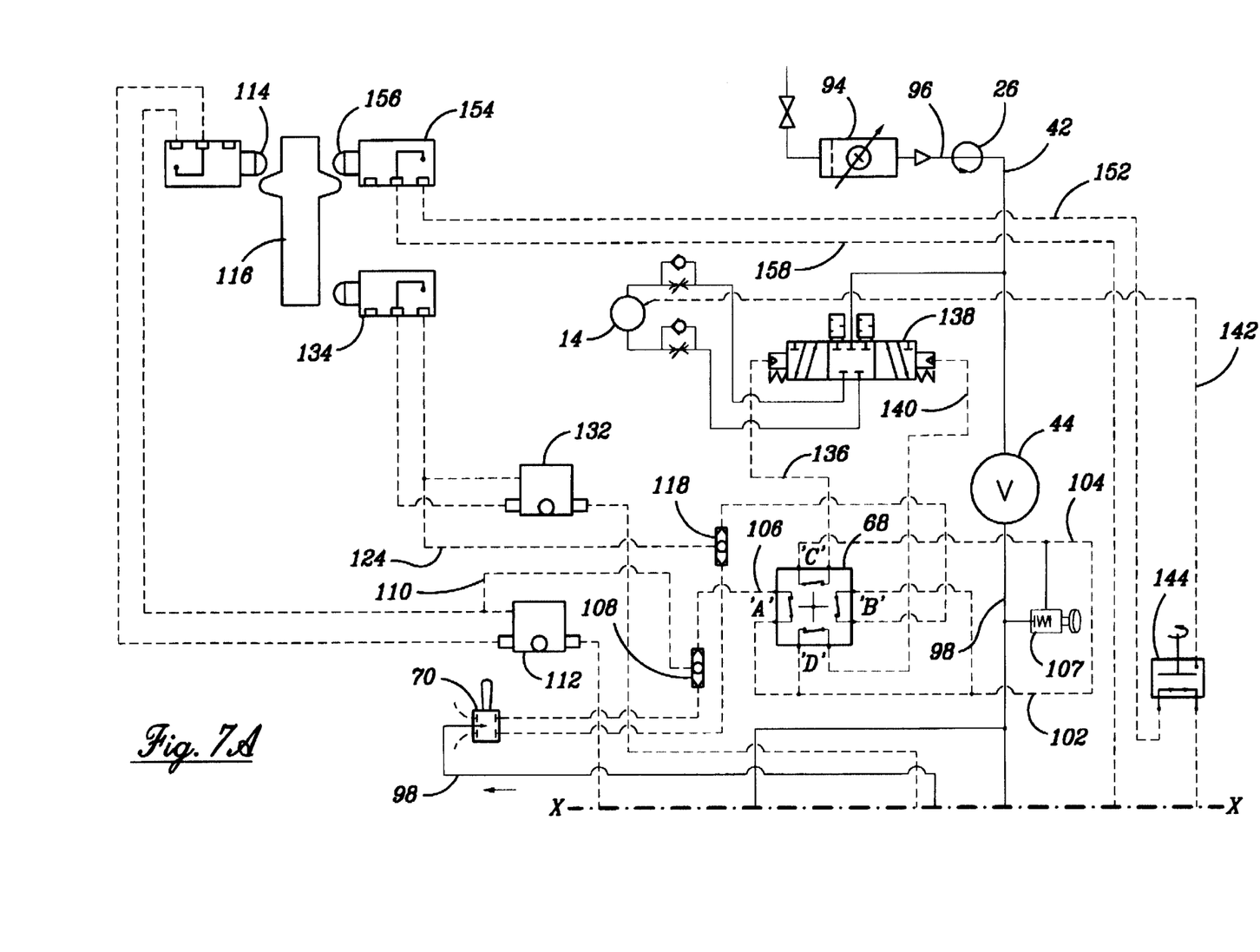
FIGS. 7A and 7B are each partial schematic diagrams of the control and operating circuit of the apparatus according to this invention, which diagrams, when joined together along the line x—x, form a complete, single schematic diagram.
Figure 7B:
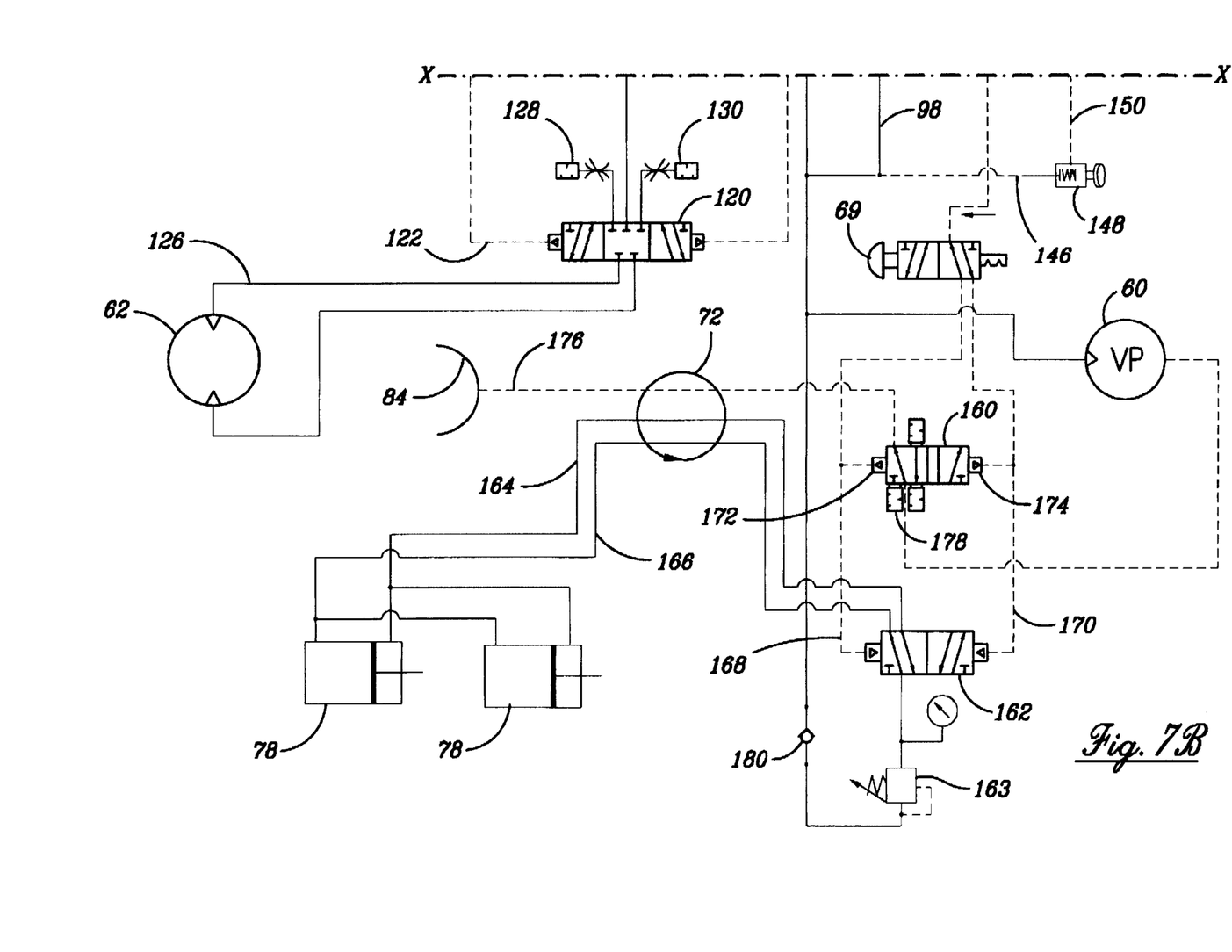

The operation and control of the apparatus 10 of this invention may be best understood by reference to the schematic diagrams of FIGS. 7A and 7B. Also, to better illustrate the operation and control, the same reference numerals used in FIGS. 1 to 6 shall be applied to the schematic where appropriate. There are basically two functions within the circuit illustrated, a first being the rotation and ascent and descent circuit, with the second being the clamping and unclamping circuit. However, before describing the operation of the system, it will be noted from FIG. 1 that air line 96 may be a single or dual air feed supply line so that sufficient air pressure is maintained for proper operation of the apparatus 10.

With reference to FIGS. 7A, 7B, the air flow schematic shown is provided with ANSI Standard symbols and is to be understood as merely indicating air flow and direction and not to be interpreted as indicating particular control based upon an individual symbol shown as "open" or "closed". Air flow connection lines shown in "solid line" indicate inlet air pressure and air flow connection lines shown in "broken line", indicate reduced air pressure for pilot air control circuits.

Air, supplied at about 90 psi through valve 94 into air feed line 96, enters the apparatus 10 through upper rotating joint 26 and through air supply line 42 to volume tank 44 continuing through line 98 to mini-regulator 107 (for controlling air pressure to the pilot air control circuits) to actuate "ABCD" air control circuits through operating switches 68, 70, which switches are preferably special purpose pneumatic "joysticks". Air control lines 102, 104 are the main air control supply lines for the joystick controls 68, 70 and are regulated by mini-regulator 107 receiving its air supply directly from volume tank 44 through high pressure air supply line 98. The pressure of the air control supply lines 102, 104 leaving mini-regulator 107 is a regulated, lower pressure, in the range of 40–60 psi.

As the joystick of control switch 68 is moved to the left or the right (positions 'A' and 'B'), this action causes a clockwise or counter-clockwise rotation, respectively, of the rotating joint 72. When the control switch 68 is engaged in the 'A' position (CW), control air enters the switch through pilot line 102 and exits through pilot line 106 to shuttle valve 108, which air pressure displaces the check ball in valve 108, so that the air flow continues through line 110. Standard "NOT" logic relay 112 and "CAM" operated limit switch 114 are maintained as an open circuit using a logic circuit tree, as known in the art. CAM 116 actuates the steel roller plunger limit switch 114 which stops a four-way spool valve 120 in order to maintain a perpendicular stop drum rotator yoke through pilot line 122 to the air motor 62 via high pressure line 126. Motor speeds are controlled by varying speed control valves 128, 130.

When opposite rotational direction 'B' (CCW) is selected by moving the joystick control switch 68 to the right, a similar series of events occur, but this time utilizing shuttle valve 118. As the counter-clockwise rotation is selected, air enters the switch 68 through pilot line 102 and then flows outward to shuttle valve 118 displacing the check ball so that the pilot air continues through line 124 to logic relay 132 and CAM operated limit switch 134. The steel roller plunger CAM operated limit switch 134 reacts in the same fashion described above, but in this case rotating the drum in the opposite direction. Standard "NOT" logic relay 132 causes rotating joint 72 to move in a counter-clockwise direction until stopped by the steel roller plunger controlled by limit switch 134.

Operation of the apparatus 10 with the joystick switch 68 in the 'C' or 'D' position causes the air piston 14 of the air cylinder lifting system to ascend or descend to lift or lower the load held by the apparatus 10. As can be seen in reference to FIG. 7A, pilot lines 102, 104 charge the 'D' and 'C' positions of joystick switch 68. Pilot lines 136 and 140 respectively control the raising and lowering of the air cylinder 14 through four-way spool valve 138. High pressure air lines exit from spool valve 138 to paired pressure regulator valves which are on each leg of the control lines to air cylinder 14.

It is to be noted that there are preferred to be two manual control switches 68, 70 which have identical functions, with the control switch 70 being positioned to allow operation of the apparatus 10 during such times when the load has been lifted or elevated such that control switch 68 is no longer readily accessible. Control switch 70, which can be identified as the remote auxiliary rotation switch, controls the rotation of the load through shuttle valves 108, 118 by displacing the check ball in the opposite direction disengaging control of the rotation function from control switch 68.

Also, for convenience, electrical lines may be included within the sheath containing such air feed line.

Clamping/Unclamping Circuit

The air for controlling the clamping and unclamping subsystem also enters the apparatus 10 through valve 94, air feed line 96 and rotary joint 26 at the top of air cylinder 14 (see FIG. 2), then through rotary joint 26 as described above and into the lifting system through air feed line 42 and Line 56a to volume tank 44. Initial clamping action is caused by clamping control valve 69 by sensing pressurized air within the volume tank 44 by adjustable pressure sensor 144. The pressure sensor 144 is preferred to be a normally open pneumatic sensor which may be adjusted according to the approximate lifting weight of the intended load. Air circuit control is provided through line 146 to mini-regulator 148 which reduces the air pressure to a range between 40—16 psi and applied to pressure sensor 144 through pilot line 150. The air circuit control exits sensor 144 through pilot line 152 and is applied to steel roller plunger operated limit switch 154, operated by plunger 156, which is actuated by the motion of CAM 116. The change of position of CAM 116 actuates the steel roller plunger 156 which, in turn, operates limit switch 154 to allow air to enter pilot line 158 which applies control air pressure to the push/pull four-way air control switch 69.

A critical component of this air control circuit is the pressure sensor 144. It will be appreciated that as a filled drum [load] is lifted, rotated and/or transported, it is vital that the clamping be maintained on the drum to avoid dropping the drum and causing an accident, spill or injury to personnel. Accordingly, when the load is clamped into the apparatus 10 and lifted, as described above, the pressure sensor 144 renders the control switch 69 inoperative so that manual or accidental operation of the switch 69 (whether to engage or release) is disabled. That is, once the pressure sensor 144 is adjusted and set to a pressure differential equivalent to a shear weight of a load, the sensor can automatically detect, through pilot line 142, the pressure required to lift the load which is clamped into the apparatus 10 so that as long as lift pressure of the air cylinder 14 continues to be detected and such pressure exceeds or is greater than the preset pressure equivalent, the control switch 69 will remain disabled and the clamping will not be released.

In further description of the air control clamping circuit, the control switch 69 provides the push/pull action to actuate the four-way spool valves 160, 162. Spool valve 162 supplies pressure to clamping actuation cylinders 78 through rotating joint 72 through lines 164, 166, respectively. This dual action both actuates and deactuates the cylinder 78 for clamping and unclamping of a load. This air control circuit, through pilot lines 168, 170, also connects to contacts 172, 174 of the four-way spool valve 160 which controls the actuation of vacuum to the cup-like members 84, 86 through pilot line 176. The source of vacuum pressure is venturi pump 60 which connects to spool valve 160 as shown in FIG. 7B.

By the push/pull action of control switch 69, the clamping system is activated or deactivated. To deactivate the clamping system, for example, by pulling the plunger on control switch 69 pilot line 176 is connected to exhaust port 178 through rotating joint 72 and spool valve 160. This connection causes the arcuate-shaped, cup-like members 84, 86 to release from the surface of the load, e.g. the drum. However, as noted above, the fail-safe pressure sensor 144 will override an accidental or manually requested release in the event that a pressurized air lifting system, i.e. greater pressure exists in the volume tank 44 than the preset pressure, is detected.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A suspendable, air and vacuum powered apparatus for the lifting, rotating, and transferring of essentially smooth-walled cylindrical objects, said apparatus comprising (a) a vertically oriented lifting mechanism consisting of an air cylinder chamber fixed at its upper end and movable at its lower end, and means to provide a positive or negative pressure to said chamber, (b) a rotating mechanism for gripping and rotating said cylindrical object, where said rotating mechanism is mounted on a fixed arm secured to said lower end for movement therewith, said rotating mechanism further including a housing having a fixed end secured to said fixed arm and a second end remote therefrom, said second end including a pair of movable gripping arms mounted for rotational movement about said second end, where said arms include at least two arcuate shaped cups positioned to apply a vacuum against the wall of said cylindrical object, with means for creating a vacuum at said cups, and (c) a fail-safe sensing system which detects a predetermined weight of said cylindrical object, whereby at a value above said predetermined weight the lifting mechanism hereof cannot be inadvertently or manually terminated.

2. The suspendable, air and vacuum powered apparatus according to claim 1, wherein said rotating mechanism includes a channel shaped member having said gripping arms pivotally mounted thereon, and a pair of pistons, one for each said arm, arranged to open and close said arms about said cylindrical object.

3. The suspendable, air and vacuum powered apparatus according to claim 2, wherein said channel includes a vacuum port in communication with a third arcuate shaped cup adapted to engage said wall of said cylindrical object.

4. The suspendable, air and vacuum powered apparatus according to claim 3, wherein each said arcuate shaped cup includes an elastomeric, peripheral sealing member, whereby to create a vacuum chamber therewithin.

5. The suspendable, air and vacuum powered apparatus according to claim 1, including means for manually operating and activating the lifting mechanism and vacuum gripping system of said apparatus.

6. The suspendable, air and vacuum powered apparatus according to claim 5, wherein said fail-safe sensing system will render inoperative said lifting mechanism and vacuum activating means when the apparatus is operable in lifting, rotating or transferring said cylindrical object.

7. The suspendable, air and vacuum powered apparatus according to claim 1, wherein there are separate air lines for said lifting mechanism and said rotating mechanism.

8. The suspendable, air and vacuum powered apparatus according to claim 1, including means secured to said upper end for suspending said apparatus from an elevated rail.

9. The suspendable, air and vacuum powered apparatus according to claim 1, wherein there is a rod linking said gripping arms to ensure a synchronized movement therebetween during closing and opening.

10. Apparatus for selective lifting and rotating a cylindrical body having an essentially smooth wall for maintaining a vacuum thereagainst, where said apparatus is suspendable and moveable along an elevated rail, said apparatus comprising a pair of synchronized clamping arms, each arm having a first end and a second end, where said first ends are mounted for rotational movement and said second ends include load engaging members comprising an arcuate shaped member having an elastomeric peripheral member for contact with said essentially smooth wall, and conduit means capable of providing a vacuum at said arcuate shaped member, means for rotating said clamping arms, and means for raising and lowering said clamping arms, where said last named means includes an air cylinder system connected to said conduit means, and a fail safe sensing means to prevent a premature release of the air cylinder and vacuum at said arcuate shaped members at a predetermined load level.

* * * * *